United States Patent [19]
Okimoto

[11] Patent Number: 4,669,441
[45] Date of Patent: Jun. 2, 1987

[54] CONTROL OF AN AUTOMOBILE POWER UNIT

[75] Inventor: Haruo Okimoto, Hiroshima, Japan

[73] Assignee: Mazda Motor Corporation, Hiroshima, Japan

[21] Appl. No.: 786,591

[22] Filed: Oct. 11, 1985

[30] Foreign Application Priority Data

Oct. 17, 1984 [JP] Japan .................... 59-218048

[51] Int. Cl.4 ............................................. F02D 23/00
[52] U.S. Cl. ........................................ 123/559; 74/732;
  192/0.072; 192/3.27; 192/3.31
[58] Field of Search ............... 74/645, 731, 732, 733;
  123/559 R, 559 B, 564; 192/0.072, 0.076, 0.096,
  3.25, 3.27, 3.31, 3.32, 103 R

[56] References Cited
U.S. PATENT DOCUMENTS
4,027,554  7/1977  Ito et al. ................. 74/866

FOREIGN PATENT DOCUMENTS
98413    8/1979  Japan .
112033   7/1982  Japan .
62319    4/1983  Japan ................. 123/559 B Primary Examiner—Stephen F. Husar
Attorney, Agent, or Firm—Fleit, Jacobson, Cohn & Price

[57] ABSTRACT

An automobile power unit includes an engine provided with a supercharger and a transmission having a hydrodynamic device such as a torque converter or a fluid coupling. The supercharger is of a type which is driven by the engine output through an appropriate clutch. The hydrodynamic device has a lock-up clutch for establishing a direct mechanical connection between the input and output members of the hydrodynamic device. A control unit is provided for at first disengaging the lock-up clutch and starting the operation of the supercharger when the automobile operating condition is in the lock-up zone and changed from the non-supercharging zone to the supercharging zone.

11 Claims, 4 Drawing Figures

CONTROL OF AN AUTOMOBILE POWER UNIT

BACKGROUND OF THE INVENTION

1. Field of the Invention

The present invention relates to a power unit of an automobile, and more particularly to an automobile power unit including an engine provided with a mechanical supercharger of a type which is driven by the engine output power, and a power transmission having a hydrodynamic power transmitting device, such as a torque converter or a fluid coupling, which is provided with a lock-up mechanism. More specifically, the present invention pertains to a control of the aforementioned type of power unit.

2. Description of Prior Art

Proposals have already been made of an engine provided with a mechanical supercharger which is driven by the engine output under a specific engine operating condition, such as a heavy load, high speed engine operation, to provide a high engine output power. For example, Japanese utility application No. 55-188933 filed on Dec. 27, 1980, and disclosed for public inspection on July 10, 1982, under the disclosure No. 57-112033, discloses an engine having an intake passage provided with a supercharger which is driven by the engine output shaft through an electromagnetic clutch so that the supercharger is driven under a heavy load range. However, as pointed out in the Japanese utility model application, this type of supercharger control produces a stepwise change in the engine output torque between the supercharged zone and the non-supercharged zone. The utility model proposes to solve the problem by relieving a controlled amount of the supercharger outlet air to the supercharger inlet so that a smooth engine output change can be established. The solution is not, however, recommendable because the partial relief of the supercharged air may cause an energy loss.

The inventor has found that, in the case of an automobile having an automatic transmission provided with a hydrodynamic power transmitting device, such as a torque converter or a fluid coupling, the aforementioned stepwise change in the engine output torque does not cause any serious problem because the hydrodynamic device can absorb the stepwise engine output torque change. It should however be noted that, in a recent development in the field of automatic transmissions, the hydrodynamic device is provided with a lock-up clutch for directly connecting the input and output members. As taught by U.S. Pat. No. 4,027,554 issued on June 7, 1977 to Ito et al, the lock-up clutch may be engaged when the rotating speed of the output member of the hydrodynamic device is increased beyond a predetermined value. In case where the hydrodynamic device is provided with a lock-up clutch and the lock-up clutch is engaged, the aforementioned stepwise change in the engine output torque may cause a shock to be transmitted to the automobile body.

SUMMARY OF THE INVENTION

It is therefore an object of the present invention to provide power transmission means which can absorb the stepwise change in the output torque of an engine having a supercharger adapted to be driven by the engine output power.

Another object of the present invention is to provide an automobile power unit including an engine provided with a mechanical supercharger driven by the engine output in a specific engine operating condition and a transmission having a hydrodynamic power transmitting device provided with a lockup mechanism, wherein any change in the engine output torque due to the supercharger being put into or out of operation can be absorbed by the hydrodynamic device.

A further object of the present invention is to provide a control for an automobile power unit of the aforementioned type, which can prevent a shock caused by a change in the engine output torque due to the supercharger being put into or out of operation.

According to the present invention, the above and other objects can be accomplished by an automobile power unit comprising an engine having a supercharger driven by an output of the engine, a transmission having a hydrodynamic device driven by said engine, said hydrodynamic device being provided with lock-up means, control means responsive to automobile operating conditions for disengaging the lock-up means and starting said supercharger to operate under a specific engine operating condition. The disengagement of the lock-up means and the start of the operation of the supercharger may be made substantially at the same time. Alternatively, the start of the operation of the supercharger may be delayed for a predetermined time after the disengagement of the lock-up means.

After the start of the supercharger operation, the lock-up means may be engaged when the automobile operating condition is in the lock-up zone. Similar control may be carried out when the supercharger is brought out of operation.

The above and other objects and features of the present invention will become apparent from the following description of preferred embodiments taking reference to the accompanying drawings.

DESCRIPTION OF THE PREFERRED EMBODIMENTS

Figure 1:
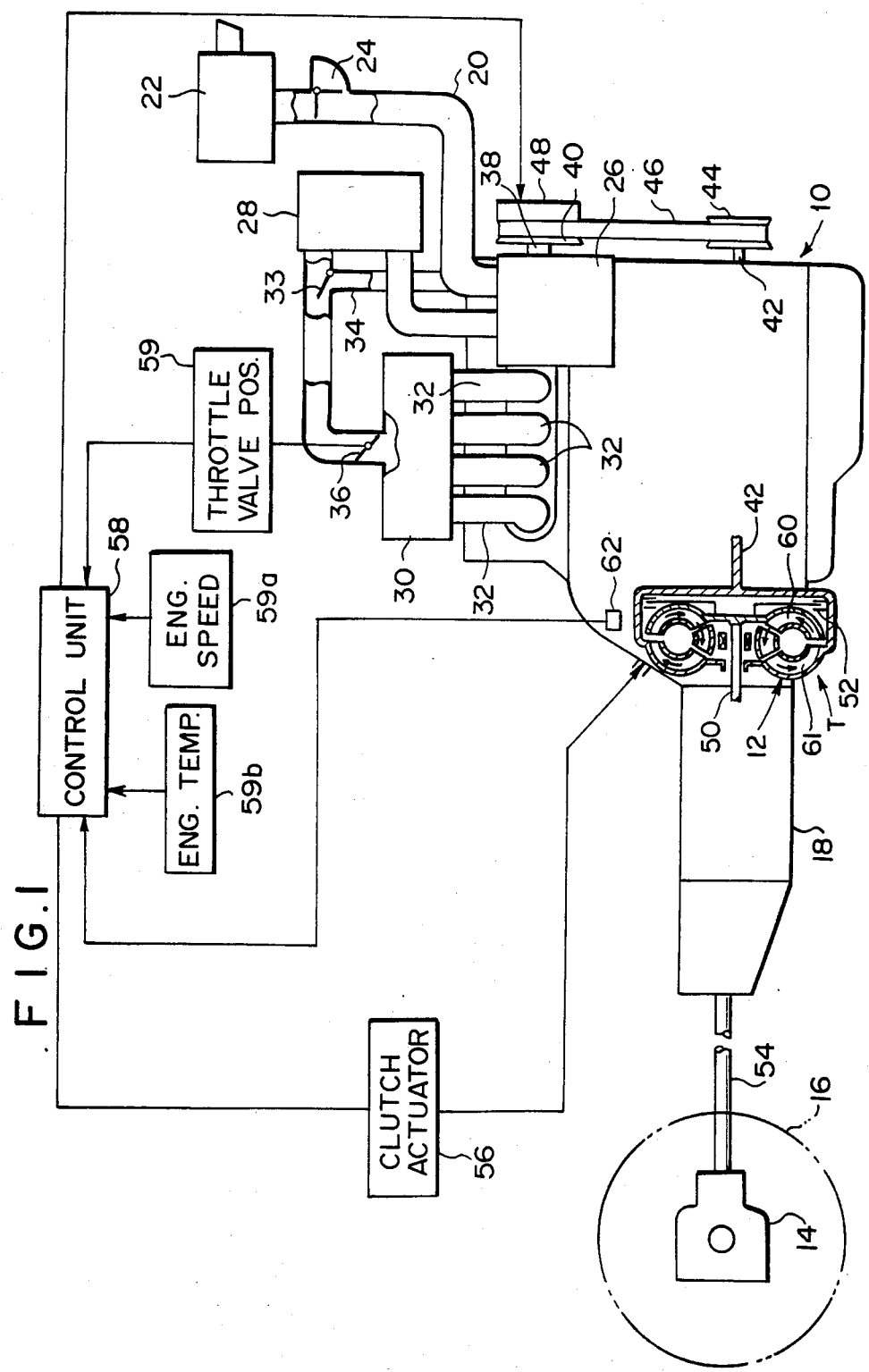
FIG. 1 is a diagrammatical illustration of an automobile power unit in accordance with one embodiment of the present invention.

Referring to the drawings, particularly to FIG. 1, there is shown a power unit including an engine 10 and a transmission 18 having a torque converter 12. As is well known in the art, the transmission T functions to transmit the engine output power to driving wheels 16 through a differential gear unit 14.

The engine 10 has an intake passage 20 provided at an upstream end with an air cleaner 22. Downstream of the air cleaner 22, the intake passage 20 is provided with an airflowmeter 24. The intake passage 20 is further provided with a supercharger 26 and an intercooler 28 for cooling the supercharging air. The intake passage 20 is formed with a surge tank 30 located downstream of the intercooler 28, and a plurality of branch passages 32 extending from the surge tank 30 to engine 10. The intake passage 20 has a bypass passage 34 connecting the portion upstream of the supercharger 26 with the portion downstream of the intercooler 28. A shut-off valve 33 is provided at the connection between the portion of the intake passage 20 downstream of the intercooler 28. The intake passage 20 is further provided between the intercooler 28 and the surge tank 30 with a throttle valve 36.

The supercharger 26 is of a mechanical type driven by he output of the engine 10 and has a driven shaft 38 carrying a pulley 40. The engine 10 has a crankshaft 42 to which a pulley 44 is secured. A power transmitting belt 46 extends endlessly between the pulleys 40 and 44. Between the driven shaft 38 of the supercharger 26 and the pulley 40, there is provided an electromagnetic clutch 48 so that the rotation of the engine crankshaft 42 is transmitted through the belt 46 to the driven shaft 38 of the supercharger 26 when the clutch 48 is engaged.

The engine crankshaft 42 is connected with the transmission T at the end opposite to the end to which the pulley 44 is secured. The transmission has the aforementioned torque converter 12 and a transmission gear unit 18. The torque converter 12 includes a pump 61 connected with the engine crankshaft 42 and a turbine 60 connected with an input shaft 50 of the transmission gear unit 18. A lock-up clutch 52 is provided between the pump 61 and the turbine 60 of the torque converter 12 so that the engine crankshaft 42 is directly connected with the input shaft 50 of the transmission gear mechanism 18 when the lock-up clutch 52 is engaged. The transmission gear unit 18 has an output shaft 54 which is connected through the differential gear unit 14 with the driven wheels 16.

The lock-up clutch 52 has a clutch actuator 56 for engaging the clutch 52. A controller 58 is provided for controlling the operations of the clutch actuator 56 and the electromagnetic clutch 48. The engine 10 is provided with a throttle valve position sensor 59 for detecting the position of opening of the throttle valve 36, an engine speed sensor 59a for detecting the engine speed, an engine cooling medium temperature sensor 59b for detecting the temperature of the engine cooling water and a turbine speed sensor 62 for detecting the speed of the turbine 60 of the torque converter 12. Signals from the sensors 59, 59a, 59b and 62 are applied to the controller 58.

Figure 3:
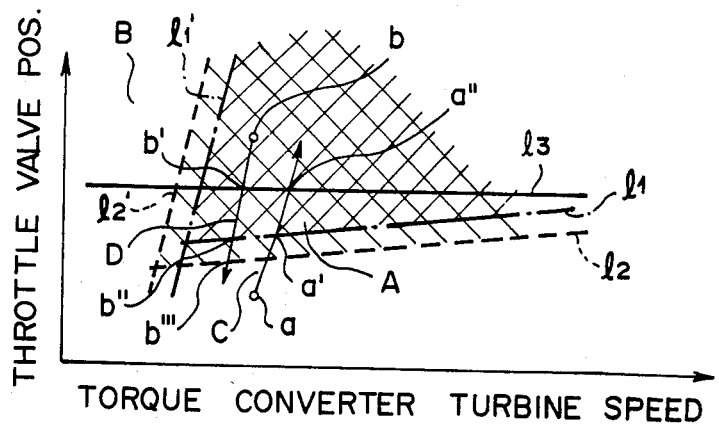
FIG. 3 is a diagram showing maps of the lock-up zone and the supercharger zone; and, FIG. 4 is a program flow chart similar to FIG. 2 but showing another example of control.

Preferably, the controller 58 is made of a microprocessor and carries out calculations based on the signals from the sensors 59, 59a and 59b to produce driving signals for actuating the clutch actuator 56 and the electromagnetic clutch 48. The controller 58 has a memory in the form of a map as shown in FIG. 3 for determining a torque converter lock-up zone A and a supercharger operating zone B in terms of the throttle valve position and the engine speed. In FIG. 3, the zone A is defined as an area which is above a lock-up line $l_1$ and to the right side of a lock-up line $l_1'$ whereas the zone B is defined as an area above a supercharge line $l_3$. When the engine is being operated under a condition represented by a point a in FIG. 3 and the engine throttle valve 36 is opened, the engine operating condition changes along an arrowed line. Then, the clutch actuator 56 is operated at a point a' where the arrowed line C crosses the lock-up line $l_1$, to thereby engage the lock-up clutch 52. Thereafter, at a point a'', wherein the arrowed line C crosses the supercharge line $l_3$, the electromagnetic clutch 48 is engaged so that the operation of the superchager 26 is started.

When the throttle valve 36 is closed from an engine operating condition represented by a point b in FIG. 3, the engine operating condition changes as shown by an arrowed line D. At a point b' where the line D intersects the supercharge line $l_3$, the electromagnetic clutch 48 is disengaged so that the supercharger 26 is made inoperative. Thereafter, at a point b'', where the arrowed line D intersects the lock-up line $l_1$, the clutch actuator 56 is operated to disengage the lock-up clutch 52. In order to avoid frequent engaging and disengaging operations of the lock-up clutch 52, a hysteresis may be provided by providing lock-up release lines $l_2$ and $l_2'$ as shown in FIG. 3. In that case, the lock-up clutch 52 is disengaged at a point b''', where the arrowed line D intersects the lock-up release line $l_2$.

Figure 2:
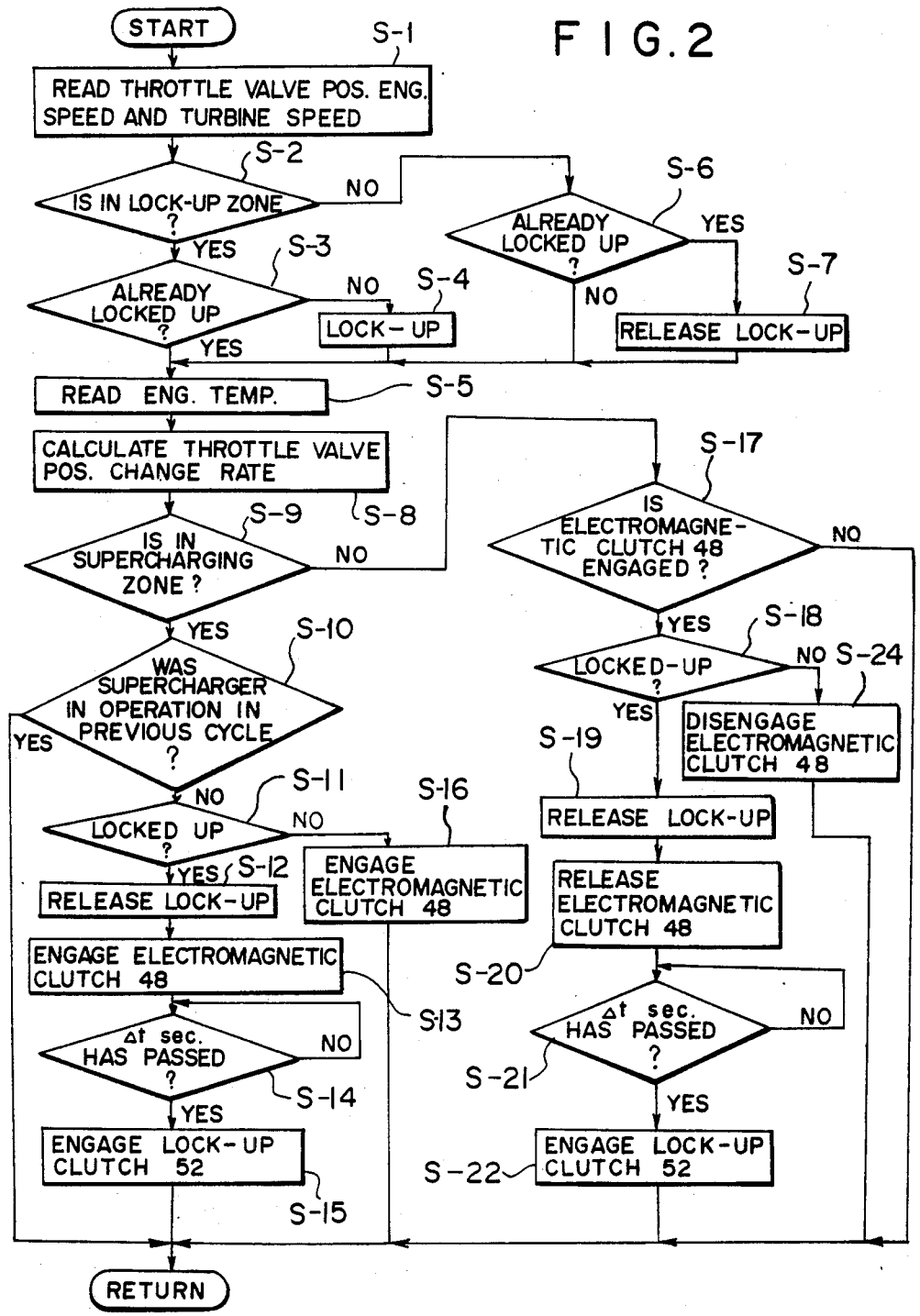
FIG. 2 is a program flow chart showing control of the torque converter lock-up and the supercharger operation.

FIG. 2 shows the operation of the controller 58. In the step S-1, the controller 58 at first reads the values of the signals from the sensors 59, 59a and 62, and a judgement is carried out in step S-2 as to whether the operating condition is in the lock-up zone A. If the result of the judgement is YES, a further judgement is made in step S-3 as to whether the lock-up clutch 52 is already engaged. If the answer is NO, a signal is applied in step S-4 to the actuator 56 to engage the lock-up clutch 52 and step S-5 is carried out to read the engine cooling medium temperature. If the result of the judgement in step S-3 is YES, the procedure goes directly to the step S-5.

If the result of the judgement in the step S-2 is NO, a judgement is made in step S-6 as to whether the lock-up clutch 52 is already engaged. If the answer in the step S-6 is YES, the lock-up clutch 52 is disengaged by operating the actuator 56 in step S-7 to release the lock-up, and the procedure goes to the step S-5. If the answer is NO, the procedure goes directly to the step S-5.

After the step S-5, a step S-8 is carried out to calculate the throttle position change rate. Then, a judgement is made in step S-9 as to whether the engine operating condition is in the supercharging zone B. If the answer is YES, a further judgement is made in step S-10 as to whether the operating condition was in the supercharging zone B in the previous operating cycle of the controller 58. If the answer in the step S-10 is YES, the procedure comes to end and a further cycle is repeated. If the result of the judgement in the step S-10 is NO, however, a further judgement is made in step S-11 as to whether the lock-up clutch 52 is engaged. If the answer is YES, the lock-up clutch 52 is disengaged in step S-12, and the operation of the supercharger 26 is started in step S-13 by engaging the electromagnetic clutch 48. Thereafter, a judgement is made in step S-14 as to whether a time $\Delta t$ has passed after the engagement of the electromagnetic clutch 48. After the time $\Delta t$, the lock-up clutch 52 is engaged again in step S-15 and the procedure is finished. If the answer in the step S-11 is NO, the electromagnetic clutch 48 is engaged in step S-16 and the procedure is finished.

In the case where the result of the judgement in the step S-9 is NO, a further judgement is made in step S-17 as to whether the electromagnetic clutch 48 is already engaged to operate the supercharger 26. If the answer is NO, the procedure is finished. However, if the answer is YES, a further judgement is made in step S-18 as to whether the lock-up clutch 52 is engaged. If the answer in step S-18 is YES, the actuator 56 is operated in step S-19 to disengage the lock-up clutch 52 and the electromagnetic clutch 48 is disengaged in step S-20. Thereafter, a judgement is made in step S-21 as to whether a time $\Delta t$ has passed after the engagement of the electromagnetic clutch 48. After the time $\Delta t$, the lock-up clutch 52 is engaged again in step S-22 and the procedure is finished. If the result of the judgement in step S-18 is NO, the electromagnetic clutch 48 is disengaged in step S-23 and the procedure is finished.

Figure 4:
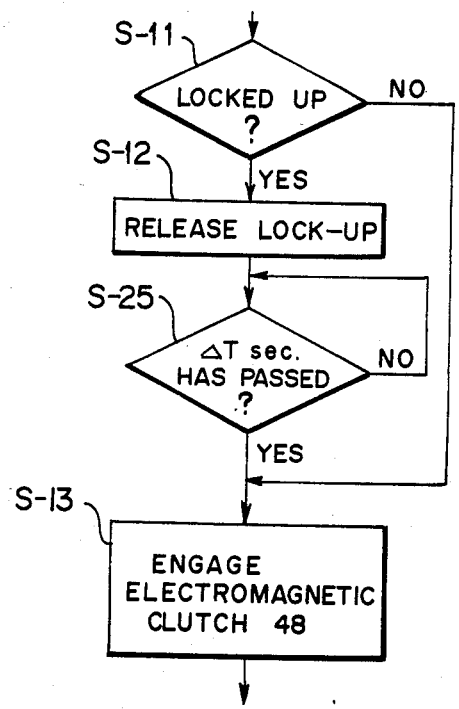

Referring to FIG. 4, it will be noted that a step S25 is carried out after the step S-12 to judge whether a time Δt has passed after the lock-up clutch 52 is disengaged. Only after the time Δt from the disengagement of the lock-up clutch 52, the step S-13 is carried out to start the operation of the supercharger 26. A step similar to the step S-25 is also carried out after the step S-19 to judge whether a time Δt has passed after the disengagement of the lock-up clutch 52. Only after the time Δt from the disengagement of the lock-up clutch 52, the step S-20 is carried out to disengage the electromagnetic clutch 48 to thereby stop the operation of the supercharger 26.

The invention has thus been shown and described with reference to specific embodiment. However, it should be noted that the invention is in no way limited to the details of the embodiments as described, but changes and modifications may be made without departing from the scope of the appended claims.

What is claimed is:

1. An automobile power unit comprising an engine having an output member, a supercharger for supplying supercharged intake air to the engine, connecting means for releasably connecting said supercharger to said output member of the engine so that the supercharger is driven by said output member of the engine, a transmission having a hydrodynamic device driven by said engine, said hydrodynamic device being provided with lock-up means, control means responsive to automobile operating conditions for disengaging the lock-up means and engaging said connecting means to start said supercharger to operate under a specific engine operating condition.

2. An automobile power unit in accordance with claim 1 in which said control means includes means for engaging said connecting means to start the supercharger to operate substantially simultaneously with the disengagement of the lock-up means.

3. An automobile power unit in accordance with claim 2 in which said control means includes means for engaging said lock-up means after said supercharger starts to operate.

4. An automobile power unit in accordance with claim 1 in which said control means includes means for engaging said connecting means to start the supercharger to operate after a predetermined time from the disengagement of the lock-up means.

5. An automobile power unit in accordance with claim 1 in which said control means includes means for disengaging the lock-up means and disengaging said connecting means to stop operation of said supercharger under another specific engine operating condition.

6. An automobile power unit comprising an engine having a supercharger driven by an output of the engine through releasable clutch means, a transmission having a hydrodynamic device driven by said engine, said hydrodynamic device being provided with lock-up means, control means responsive to automobile operating conditions, said control means having memories of factors relating to automobile speed and engine output power to define a supercharging zone wherein said supercharger is to be operated, a non-supercharging zone wherein said supercharger is not to be operated, a lock-up zone wherein said lock-up means of hydrodynamic device is to be engaged, and a lock-up release zone wherein the lock-up means is to be disengaged, said control means including means for disengaging the lock-up means and engaging the clutch means to start said supercharger to operate when the operating condition is in said lock-up zone and changed from the non-supercharging zone to the supercharging zone.

7. An automobile power unit in accordance with claim 6 in which said control means includes means for engaging the lock-up means after a predetermined time when the supercharger is started to operate when the operating condition is in the lock-up zone.

8. An automobile power unit in accordance with claim 6 in which said control means includes means for disengaging the lock-up means and releasing said clutch means to stop operation of said supercharger when the operating condition is in said lock-up zone and changed from the supercharging zone to the non-supercharging zone.

9. An automobile power unit in accordance with claim 8 in which said control means includes means for engaging the lock-up means after a predetermined time when the operating condition is in the lock-up zone.

10. An automobile power unit in accordance with claim 6 in which said control means includes means for starting said supercharger to operate after a predetermined time when the lock-up means is disengaged.

11. An automobile power unit comprising an engine having a supercharger driven by an output of the engine through releasable clutch means, a transmission having a hydrodynamic device driven by said engine, said hydrodynamic device being provided with lock-up means, control means responsive to automobile operating conditions, said control means having memories of factors relating to automobile speed and engine output power to define a supercharging zone wherein said supercharger is to be operated, a non-supercharging zone wherein said supercharger is not to be operated, a lock-up zone wherein said lock-up means of the hydrodynamic device is to be engaged, and a lock-up release zone wherein the lock-up means is to be disengaged, said control means including means for disengaging the lock-up means and releasing said clutch means to stop operation of said supercharger when the operating condition is in said lock-up zone and changed from the supercharging zone to the non-supercharging zone.

* * * * *